(12) United States Patent
Matsukawa et al.

(10) Patent No.: US 6,553,470 B1
(45) Date of Patent: Apr. 22, 2003

(54) BACKUP MEMORY CONFIGURATION AND TRANSMISSION SYSTEM USING THE SAME

(75) Inventors: Kouichi Matsukawa, Tokyo (JP); Hiroshi Hattori, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/444,874

(22) Filed: Nov. 22, 1999

(30) Foreign Application Priority Data

Jun. 15, 1999 (JP) .......................................... 11-168823

(51) Int. Cl.$^7$ ............................................. G06F 12/00
(52) U.S. Cl. ......................... 711/162; 711/114; 711/103
(58) Field of Search ................................. 711/162, 103, 711/114

(56) References Cited

U.S. PATENT DOCUMENTS 5,390,335 A    2/1995   Stephan et al. ............. 709/221
5,845,095 A   12/1998   Reed et al. ................... 710/104
5,917,998 A  * 6/1999   Cabrera et al. ............. 711/114

FOREIGN PATENT DOCUMENTS

| EP | 0 535 761 A2 | 4/1993 |
| JP | 11-317745 | 11/1999 |

* cited by examiner

*Primary Examiner*—Do Hyun Yoo
*Assistant Examiner*—Brian R. Peugh
(74) *Attorney, Agent, or Firm*—Rothwell, Figg, Ernst & Manbeck

(57) ABSTRACT

A backup memory for constituent packages constituting a transmission system for communication stores a key code identifying the package and configuration data for the package. The constituent packages can be started in a parallel manner based on key code comparison performed between a main CPU and the package so that the time required to start the package is reduced.

9 Claims, 18 Drawing Sheets

BACKUP MEMORY CONFIGURATION AND TRANSMISSION SYSTEM USING THE SAME

BACKGROUND OF THE INVENTION

1. Field of the Invention

The present invention generally relates to backup memory configuration and transmission systems for communication using the same and, more particularly, to a backup memory configuration in which configuration data for a main CPU package and constituent packages are stored and the consistency of data is maintained, and also to a transmission system for communication using such backup memory configuration.

2. Description of the Related Art

FIG. 19 is a block diagram showing a transmission system for communication according to the related art. Referring to FIG. 19, numeral 190 indicates a package with a main CPU mounted thereon. The package 190 serves as a monitor and control unit and provides a main CPU capability to the system. Numeral 200 indicates a backup memory attached to the main CPU package 190 and storing key codes and configuration data for constituent packages described later. Each of numerals 191–195 indicates a constituent package constituting the transmission system for communication and having respective devices; and 196 indicates an internal bus connecting the main CPU package 190 and each of the constituent packages 191–195. Specifically, the constituent package 195 does not require a parameter package.

In the transmission system for communication according to the related art, parameters and configuration data set in each of the constituent packages 191–194 constituting the system are permanently stored in the backup memory 200 implemented by, for example, a non-volatile memory. In the event that a power failure occurs in the transmission system or a package is exchanged for a substitute package, a key code and configuration data stored in the backup memory 200 are read out upon start-up of the entirety of the system or the substitute package. The key code and configuration data are then sent to the corresponding one of the packages 191–194 so that the package is properly set up, thus causing the system to automatically transit to the normal operating condition. This way, the suspended communication service is promptly resumed.

As the number of parameters set up in the transmission system for communication is increased with an increase in the scale, complexity and versatility of the system, the number of parameters sent from the monitor and control unit to constituent packages when the transmission system is started or when the individual constituent package is started is increased. Accordingly, an intensive load is imposed on the monitor and control unit when the system is started, and a relatively long period of time is required in order to start constituent packages in the system.

Advancement in the functions of the transmission system may require a plurality of constituent packages to operate in cooperation with each other so as to implement a required function. In this case, it is difficult for individual constituent packages to handle the parameters in a manner not affecting the other packages. A requirement thus arises that the data set up for the devices in the packages be consistent. Since the monitor and control unit implemented by the main CPU package 190 should check the consistency upon start-up of the device(s), the load imposed on the main CPU package 190 involving retrieval processes and comparison processes is increased as a result. Consequently, the time required to start the entire system is increased.

SUMMARY OF THE INVENTION

Accordingly, a general object of the present invention is to provide a backup memory configuration and a transmission system using the same, in which the aforementioned drawback is eliminated.

Another and more specific object is to provide a backup memory configuration and a transmission system using the same, in which the start-up process of the transmission system for communication is distributed among a plurality of constituent packages constituting the system so that the start-up time is reduced, and in which the consistency of the data set up in the devices in the constituent packages is ensured.

The aforementioned objects can be achieved by a backup memory configuration system for use in a transmission system for communication having a control package provided with a main CPU and a plurality of constituent packages provided with respective devices, and an operation system for supplying configuration data required for operation of the plurality of constituent packages, comprising: backup memories attached to each of the control package and the plurality of constituent packages; wherein each of the control package and the plurality of constituent packages stores, in the backup memory attached to the package, a key code identifying the package and the configuration data for the package; and the control package allocates and distributes the key codes to the plurality of constituent packages that refer to the key code when the transmission system is started, and allocates and distributes the key code to an individual constituent package when the configuration data is set in the individual constituent package.

When a power of any of the plurality of constituent packages is turned on so that the package is started, the key code maintained by the main CPU provided in the control package may be compared with the key code stored in the backup memory for the started package so as to determine whether the package was used in the same transmission system before the power is turned on; when it is determined that the started package was used in the same transmission system before the power is turned on, the key code and the configuration data stored in the backup memory for the started package may be read out so that a start operation is performed using the key code and the configuration data thus read out; and when it is determined that the started package was not used in the same transmission system before the power is turned on, the key code stored in the backup memory for the started package may be discarded so that a start operation is performed using a predetermined default setting.

When it is determined that any of the control package and the plurality of constituent packages is being used in a transmission system different from the transmission system in which the started package was used, the started package notifies one of the control package and the operation system that the package is started with the default setting, and sets the configuration data retrieved from one of the control package and the operation system in the started package.

When it is determined, upon a start-up of the transmission system, that the transmission system is going through an initial start-up process as a result of key code comparison by the main CPU, the main CPU may generate new key codes and transmit the generated key codes to each of the plurality of constituent packages that refer to the key code, whereupon each of the plurality of constituent packages receiving the key code may initiate a start-up operation based on the received key code; and wherein when it is determined that the packages are being started in the same transmission system as a previous transmission system, the key code and the configuration data stored in the backup memories for the packages may be read out so that each of the packages is started based on the key code and the configuration data thus read out.

The key code may be generated using time value output by the time circuit when the system is started.

An indefinite value occurring in a memory area when the transmission system is started may be used as a seed for a random number generator circuit so that the key code is generated based on a value generated by the random number generator circuit.

An indefinite value occurring in a memory area when the transmission system is started may be used as a seed for a counter circuit so that the key code is generated based on a value generated by the counter circuit.

The aforementioned objects can also be achieved by a transmission system for communication comprising: a control package provided with a main CPU; a plurality of constituent packages provided with respective devices; and backup memories attached to each of the control package and the plurality of constituent packages; wherein each of the control package and the plurality of constituent packages stores, in the backup memory for the package, a key code identifying the package and configuration data required for operation of the package; and the control package allocates and distributes the key codes to the plurality of constituent packages when the transmission system is started, and allocates and distributes the key code to an individual constituent package when the configuration data is set in the individual constituent package.

The transmission system may further comprise: a time circuit for outputting a time value; a random number generator circuit for generating a random number using an indefinite value in a memory area as a seed; a counter circuit for generating a value using an indefinite value in the memory area as a seed; a key code generation circuit for generating the key code based on one or a combination of values generated by said time circuit, random number generator circuit and counter circuit.

BRIEF DESCRIPTION OF THE PREFERRED EMBODIMENTS

Other objects and further features of the present invention will be apparent from the following detailed description when read in conjunction with the accompanying drawings, in which.

DETAILED DESCRIPTION OF THE PREFERRED EMBODIMENTS

Embodiment 1

Figure 1:
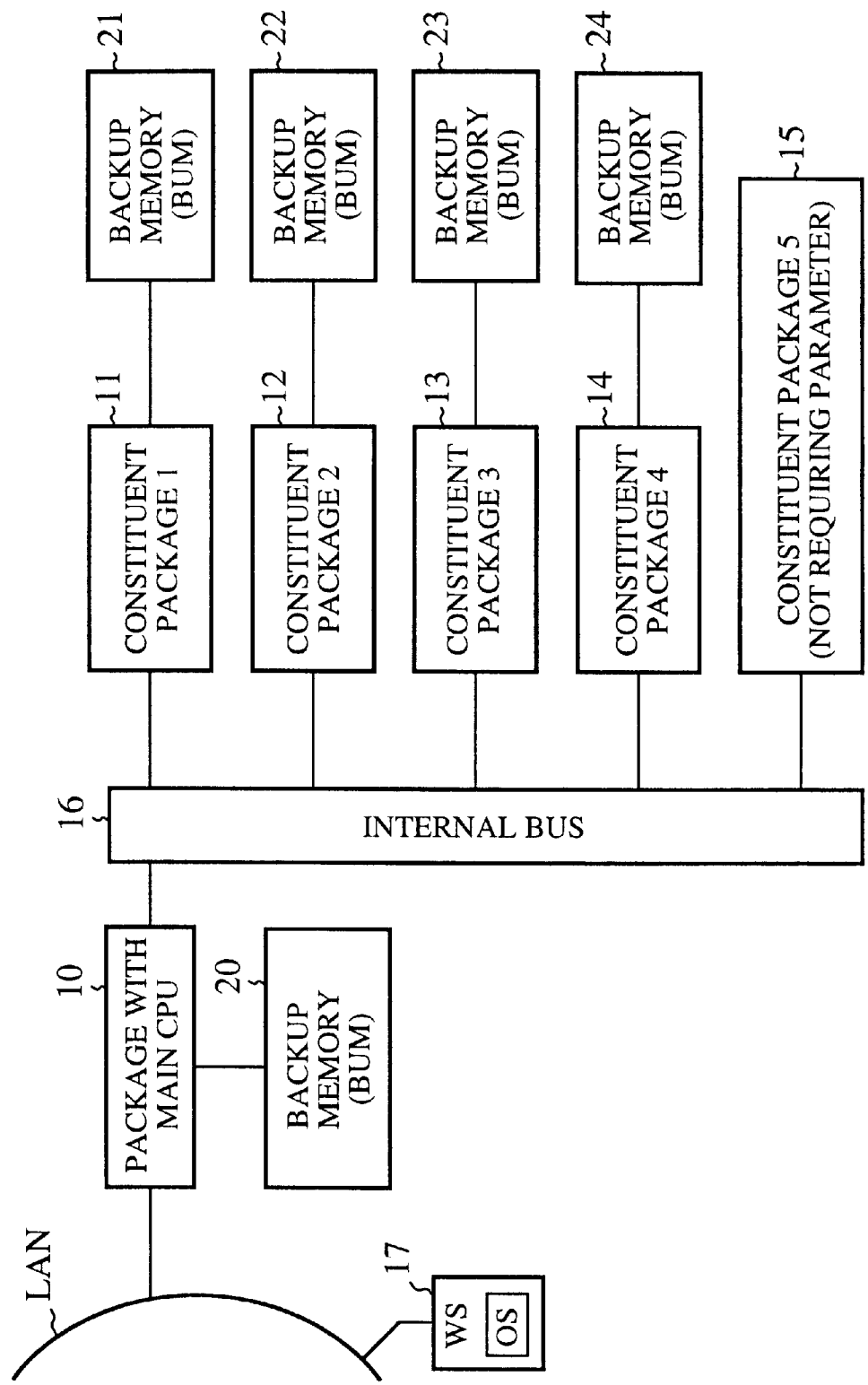
FIG. 1 is a block diagram showing the construction of a transmission system for communication based on a backup memory configuration according to a first embodiment.

FIG. 1 is a block diagram showing the construction of a transmission system for communication based on a backup memory configuration according to a first embodiment. Referring to FIG. 1, numeral 10 indicates a package having a main CPU mounted thereon (control package) and implementing a monitor and control unit for controlling the entirety of the system. Numeral 20 indicates a backup memory (BUM) connected to the main CPU package 10 and storing configuration data.

Numerals 11–14 indicate constituent packages constituting the transmission system and having respective devices mounted thereon. The constituent packages 11–14 are connected to backup memories (BUM) 21–24, respectively. 15 also indicates a constituent package. The constituent package 15 does not require any parameter to be set therein and is not connected to a backup memory. Each of the backup memories 21–24 stores configuration data for the corresponding one of the constituent packages 11–14 and a key code for ensuring the consistency of the configuration data. An initial value of the key code is NULL. Numeral 16 indicates an internal bus connecting the main CPU package 10 and the constituent packages 11–15.

The transmission system for communication is connected to a local area network (LAN) which is in turn connected to a workstation (WS) 17 provided with an operation system. The main CPU accesses the operation system of the workstation as required so as to retrieve necessary configuration data.

A description will now be given of the operation according to the first embodiment.

First, the operation at start-up performed in the transmission system according to the first embodiment will be described.

At initial start-up of the system, the constituent packages 11–14 do not maintain any data. The key code is set to NULL. The main CPU in the main CPU package 10 determines that the packages are going through an initial start-up by referring to the NULL key code stored in the backup memory 20. The CPU then sets the key code(s) in the constituent packages 11–14.

Figure 2:
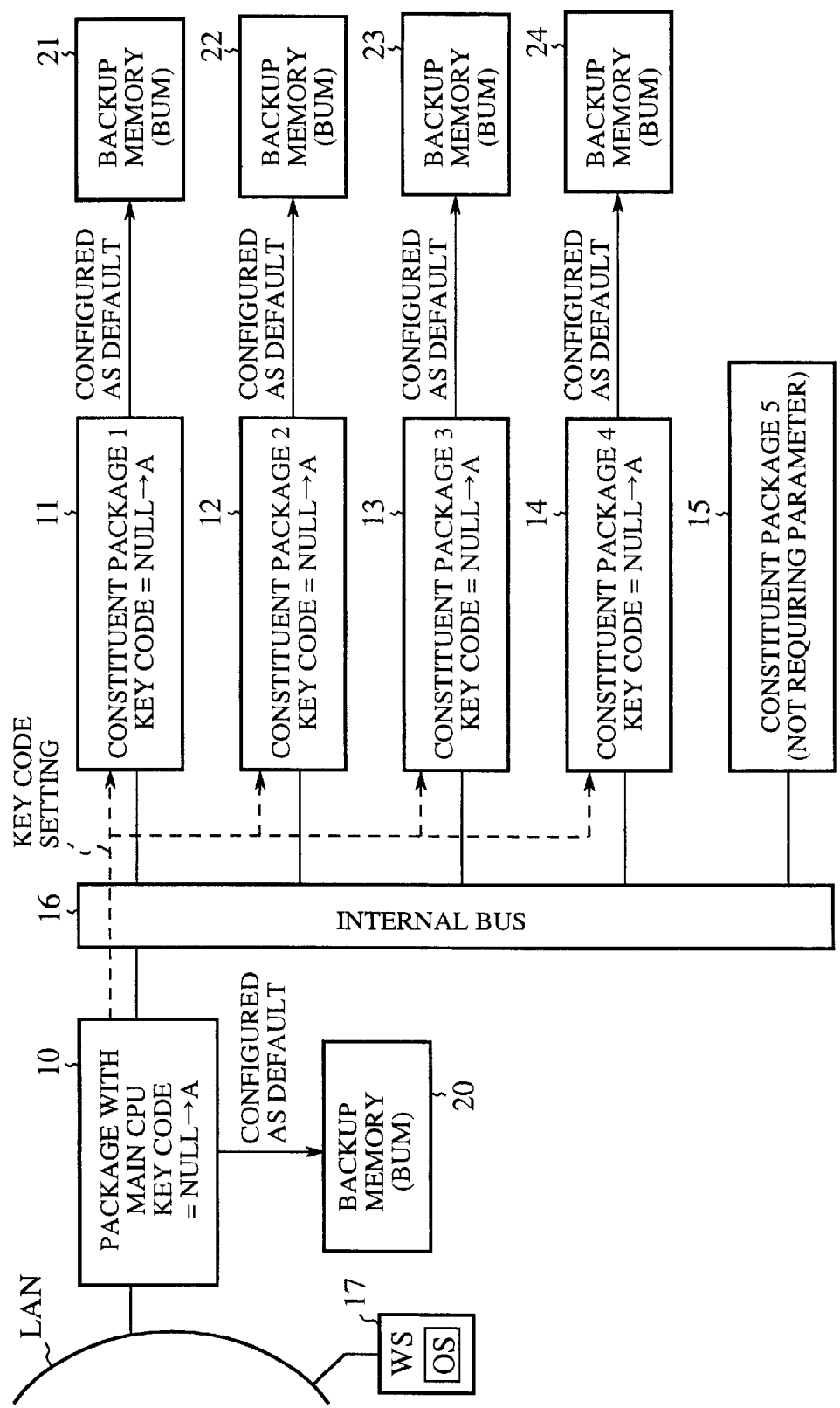
FIG. 2 is a block diagram showing an operation at initial start-up of the transmission system according to the first embodiment.
Figure 3:
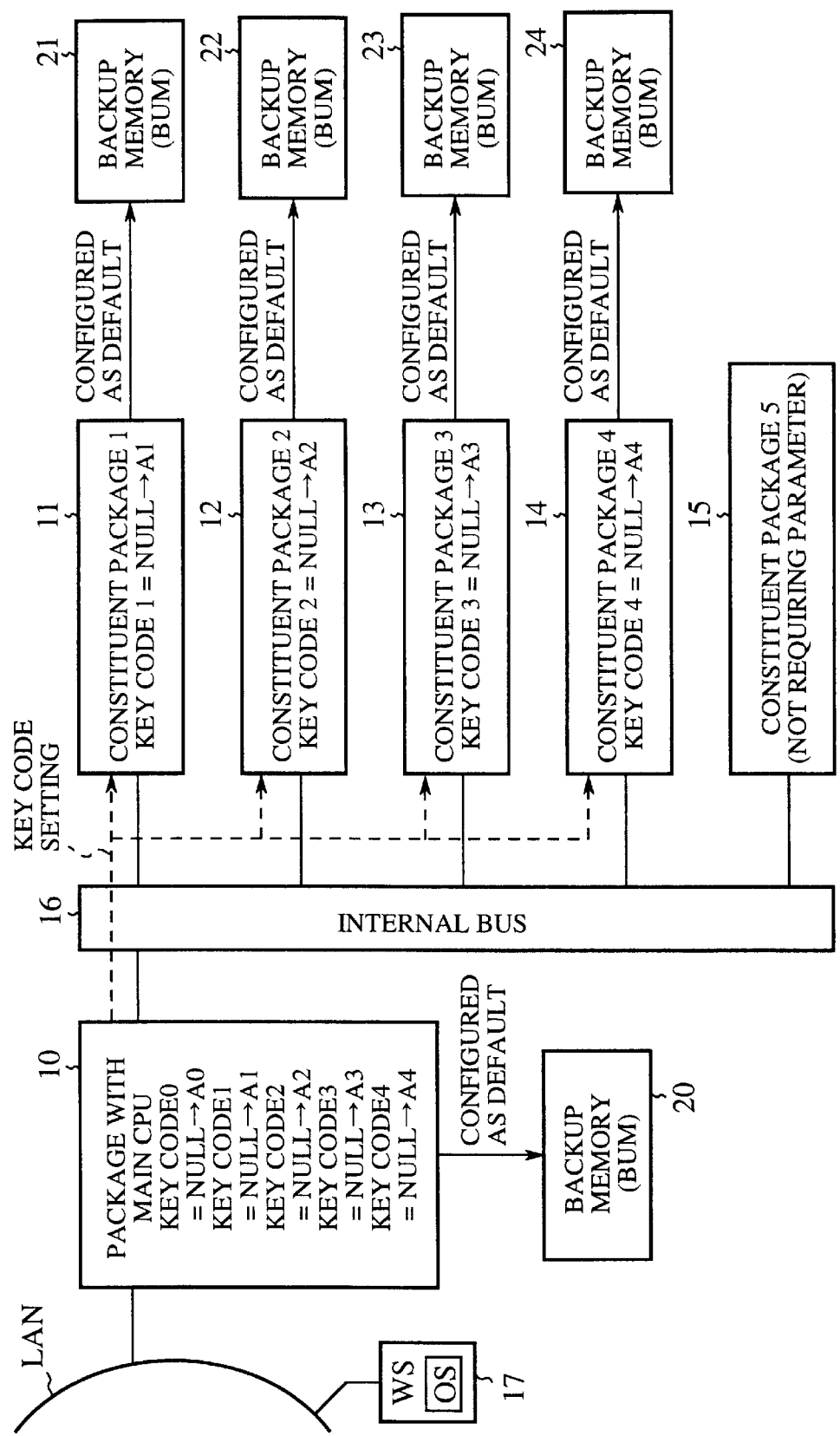
FIG. 3 is a block diagram showing another operation at initial start-up of the transmission system according to the first embodiment.

FIGS. 2 and 3 are block diagrams illustrating the operations performed in the transmission system according to the first embodiment at the initial start-up. Specifically, FIG. 2 shows a case where a global key code is assigned and maintained for the packages. That is, a single key code A is distributed to the constituent packages 11–14. Generation of the key code will be described in detail in the eighth embodiment. The constituent packages 11–14 store the received key code A as a default value in the backup memories 21–24, respectively, and maintain the stored key code A.

More specifically, at start-up, the devices mounted in the constituent packages 11–14 refer to the backup memories 21–24, respectively, and determine that the system is going through an initial start-up by recognizing that the NULL key code is read out. Thereupon, the NULL key code is updated in each of the packages 11–14 so that the key code A received from the CPU is set therein. Thereafter, the key code A is stored in the backup memories 21–24 as a default value.

FIG. 3 shows a case where key codes are uniquely assigned and maintained for the devices in the constituent packages 11–14. That is, a unique key code is distributed to each of the devices. In the illustrated example, the devices mounted in the constituent packages 11–14 store the unique key codes A1, A2, A3 and A4 as default values in the backup memories 21–24, respectively.

Each of the devices mounted in the constituent packages 11–14 enters a start-up operation responsive to an instruction from the CPU in the main CPU package 10. The devices recognize that an initial start-up process is being performed by referring to the backup memories 21–24 and finding that the NULL key codes are stored therein. Thereupon, the key codes A1–A4 received from the CPU are made to replace the NULL key code. The key codes A1–A4 are then stored as default values in the backup memories 21–24, respectively.

As described, according to the first embodiment, a backup memory is provided for a main CPU package and for each of the constituent packages requiring parameter setting. A key code identifying the constituent packages is used to ensure consistency of data in the backup memories (see the second and subsequent embodiments). A determination that the system is going through an initial start-up is yielded when it is found that the constituent packages do not maintain any data, and the key code is set to NULL. Upon the determination of an initial start-up, the key code is distributed to the constituent package.

With the distributed provision of the backup memories according to the first embodiment, the constituent packages can be started automatically and in a parallel manner, when the transmission system recovers from a power failure. Thus, the time required for start-up of the system as a whole is reduced.

Embodiment 2

Figure 4:
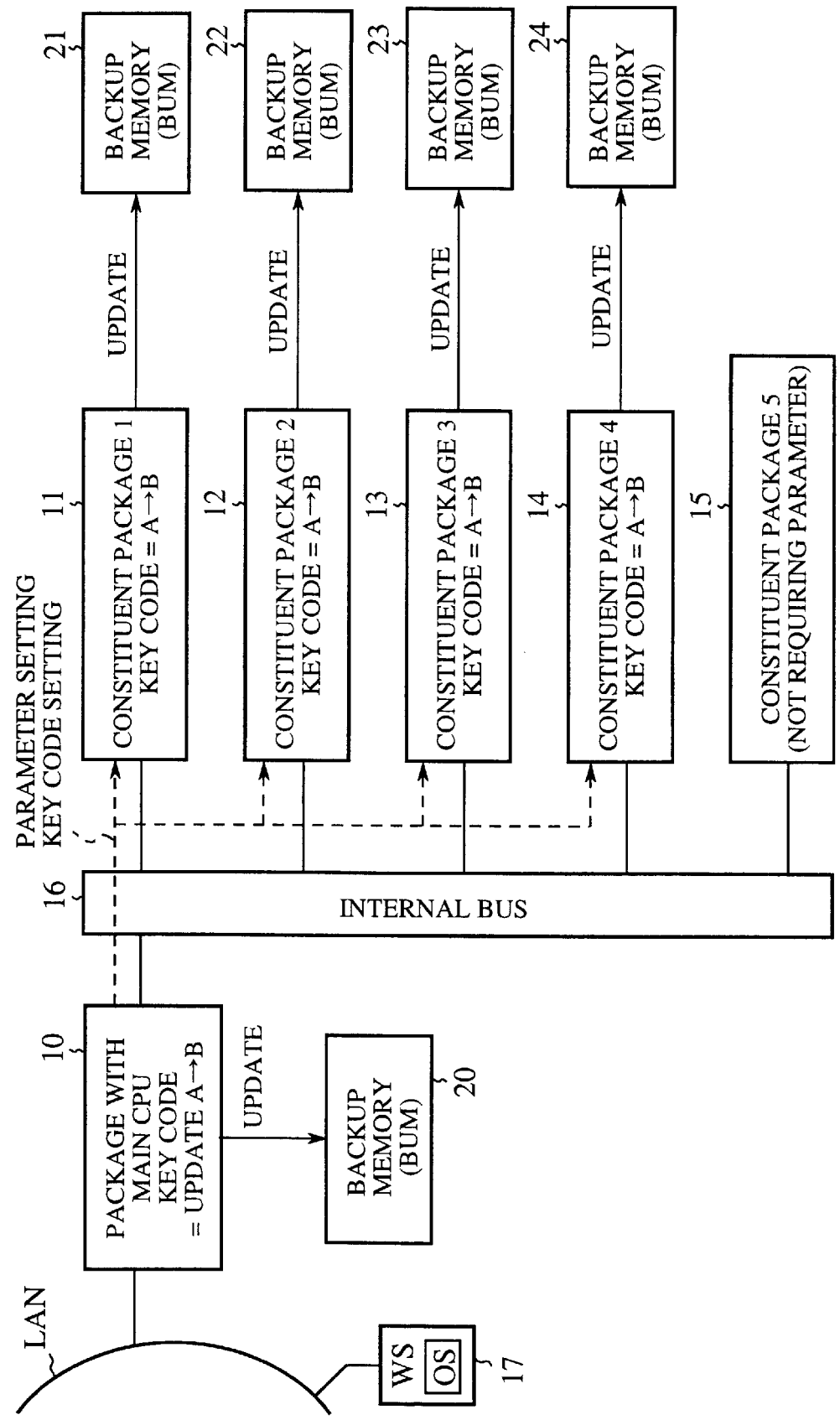
FIG. 4 is a block diagram showing the construction of a transmission system for communication based on a backup memory configuration according to a second embodiment.

FIG. 4 is a block diagram showing the construction of the transmission system for communication based on the backup memory configuration according to the second embodiment. The construction of the transmission system is the same as that of the first embodiment. Like numerals represent like components and the description thereof is omitted.

A description will now be given of a parameter setting operation in the backup memory configuration according to the second embodiment. When the transmission system is started, parameters are set in the constituent packages 11–14 so as to make the system available for use. FIG. 4 shows a parameter setting operation performed when a key code is maintained on a global basis. That is, a single key code is assigned to the constituent packages 11–14.

Setting of parameters in the devices is controlled by a managing device such as the workstation 17 connected to the LAN and provided with an operation system. The main CPU in the main CPU package 10 determines on a latest key code B to be set for the devices. The CPU then distributes the latest key code B to the constituent packages 11–14 having the respective devices and also distributes latest parameters to the devices. The main CPU package 10 updates the key code information maintained by the main CPU.

Figure 5:
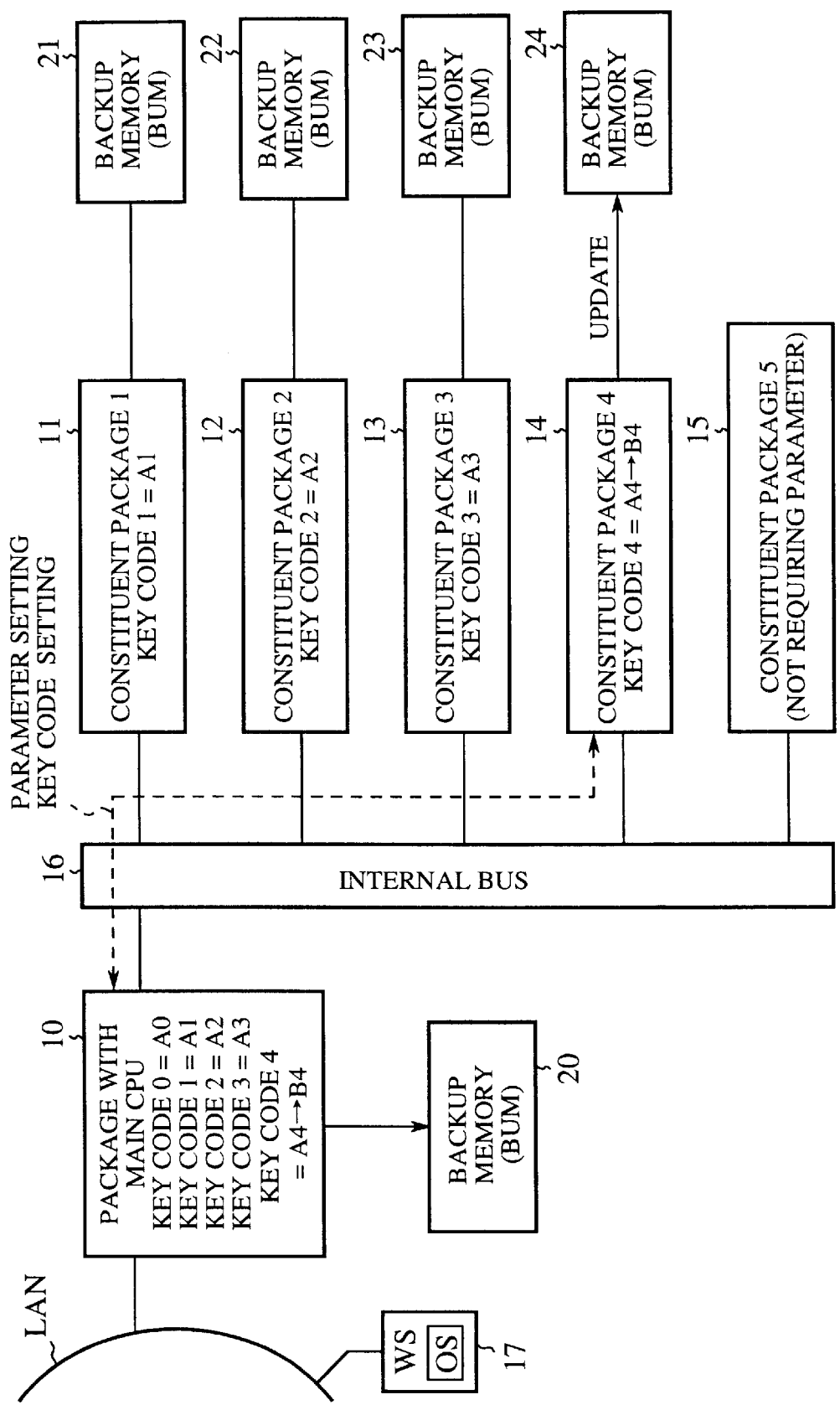
FIG. 5 is a block diagram showing an operation in the second embodiment for parameter setting in individual constituent packages when different key codes are assigned to respective constituent packages.

FIG. 5 is a block diagram showing a parameter setting operation performed when the constituent packages 11–14 maintain unique key codes A1, A2, A3 and A4, respectively.

When the parameter setting operation for the illustrated transmission system is initiated by the operation system of the workstation 17 connected to the LAN, the main CPU in the main CPU package 10 determines on the latest key code to be set in the constituent package, and distributes the latest key code to the constituent package.

The main CPU in the main CPU package 10 sets the parameters for the constituent package based on the parameters received from the operation system of the workstation 17 via the LAN. The main CPU also updates the key code information related to the constituent package and maintained in the backup memory 20.

For example, in the example illustrated in FIG. 5, the constituent package 14 is going through a setting process.

The main CPU updates the key code from A4 to B4 and transmits the new key code B4 to the constituent package 14. The new code received from the main CPU is set in the constituent package 14 and stored in the backup memory 24.

Thus, according to the second embodiment, a backup memory is provided for a main CPU package and for each of the constituent packages requiring parameter setting. A key code is used to ensure consistency of data in the backup memories. Parameter setting for the constituent package by a managing device such as a workstation connected to a LAN and provided with an operation system is performed based on the key code assigned by the main CPU to the constituent package.

Embodiment 3

FIGS. 6–9 are block diagrams showing the construction of the transmission system for communication based on the backup memory configuration according to the third embodiment. The construction of the transmission system is the same as that of the first embodiment. Like numerals represent like components and the description thereof is omitted.

A description will now be given of an operation at start-up of the transmission system based on the backup memory configuration according to the third embodiment.

When the parameter setting is properly performed after an initial start-up of the transmission system, the key code set in each of the constituent packages 11–14 should match the corresponding key code maintained by the main CPU. When the entirety of the transmission system experiences a power shutdown and then recovers therefrom, a start-up process of the entirety of the transmission system is performed.

The main CPU recognizes that the transmission system is being started in a recovery from the power shutdown, by finding that none of the constituent packages has been started and that the key code is already set in the main CPU package 10. The main CPU may recognize that none of the constituent packages has been started by causing each of the constituent packages 11–14 to write a predetermined value in a 2port RAM when the start-up process is completed and ensuring that the main CPU reads the predetermined value in the 2port RAM.

The start-up process of the transmission system is performed in accordance with the data stored in the backup memory 20. Each of the constituent packages 11–14 initiates a start-up process thereof responsive to an instruction from the main CPU. More specifically, each of the constituent packages compares the key code maintained by the main CPU with the key code maintained in the constituent package. If the key codes match, the package reads the data stored in the backup memory attached thereto. The package is started in accordance with the data thus read out.

Figure 6:
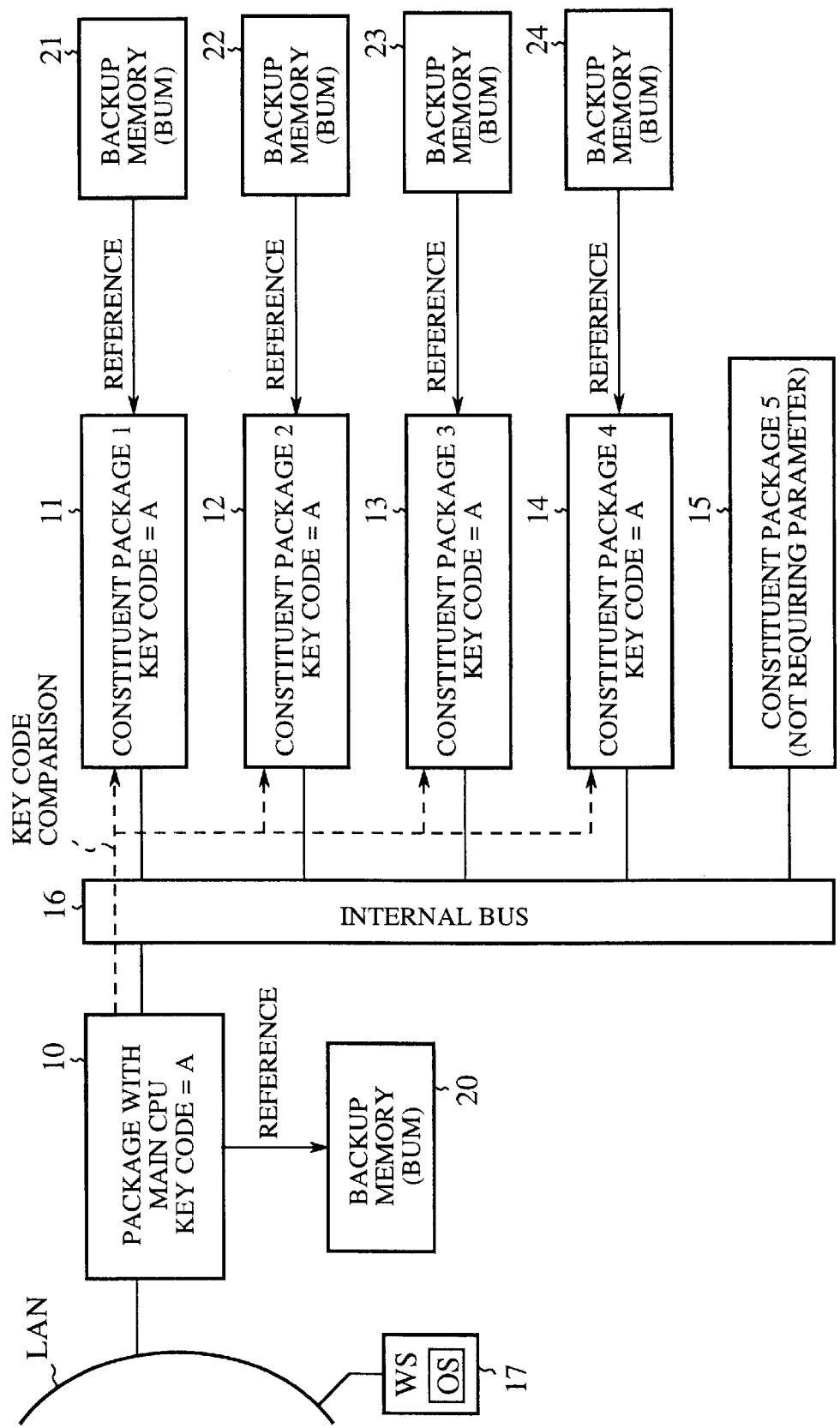
FIG. 6 is a block diagram showing the construction of a transmission system for communication based on a backup memory configuration according to a third embodiment and showing an operation at start-up of the transmission system.

FIG. 6 shows an example where the global key code A is maintained in the entirety of the transmission system and where the key code A from the main CPU matches the key code A maintained by the packages.

Figure 7:
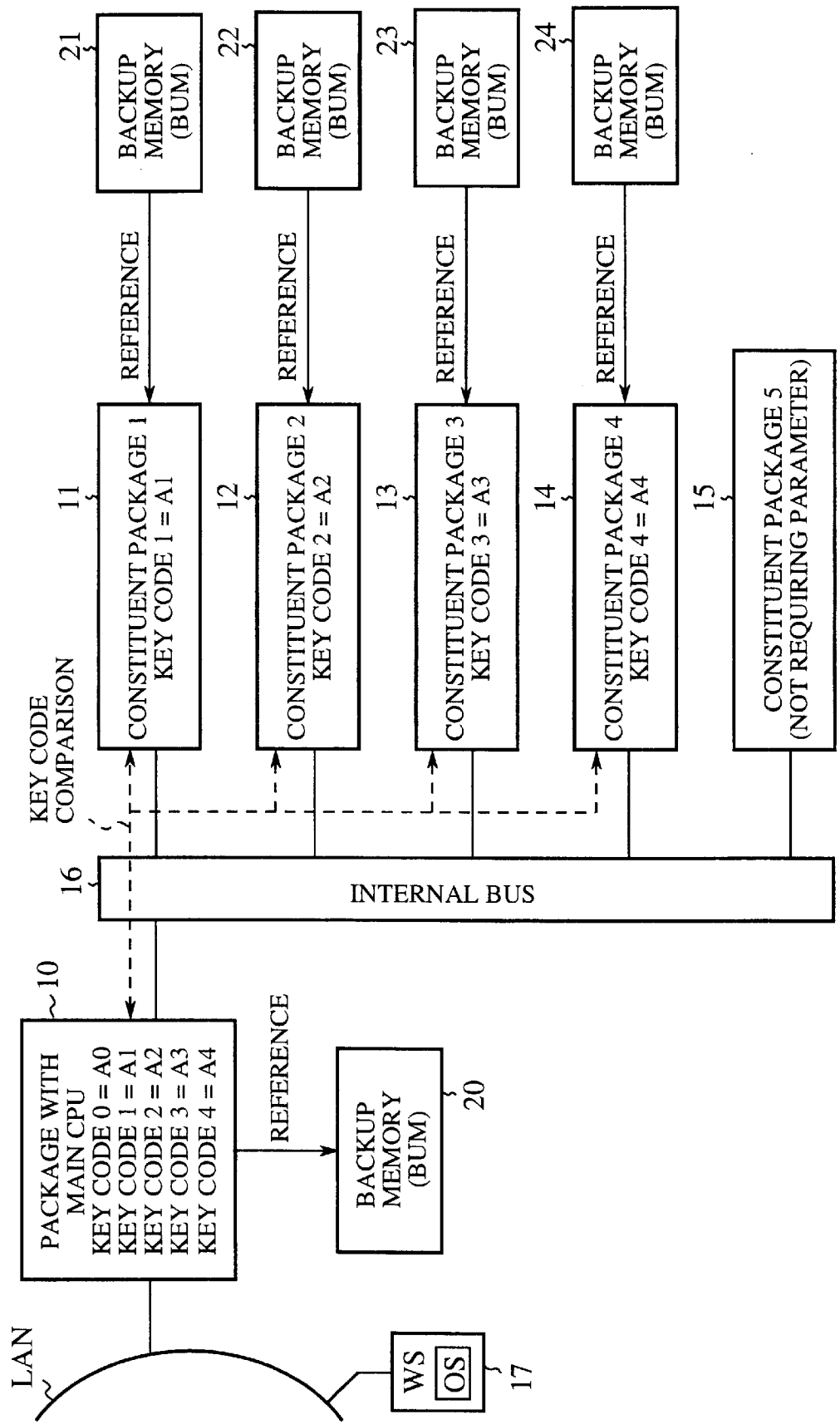
FIG. 7 is a block diagram showing the construction of the transmission system based on the backup memory configuration according to the third embodiment and showing another operation at start-up of the transmission system.

FIG. 7 shows a case where the main CPU in the main CPU package 10 maintains unique key codes A1–A4 for the constituent packages 11–14, respectively, and where each of the key codes A1–A4 from the CPU matches the corresponding one of the key codes A1–A4 maintained by the packages.

In contrast, if it is determined that the key code maintained by the CPU does not match the key code maintained by the constituent package, the package reads the data stored in the backup memory attached thereto as default data. The package then starts itself with the key code set to NULL. The package thus started notifies the main CPU that it is started with the default setting and requests the CPU to initiate a recovery process.

Upon being notified by the constituent package, the main CPU makes a determination as to whether the setting for the requesting constituent package is stored in the backup memory 20. If it is determined that the setting is stored, the main CPU reads all the parameters and the key code for the requesting constituent package from the backup memory 20 and sets the parameters and key code thus read in the requesting package.

If it is determined that the setting for the requesting package is not stored in the backup memory 20, the main CPU notifies the operation system of the workstation connected thereto via the LAN that the requesting package is started with the default setting. The operation system examines a database that it maintains so as to read out the setting, including the parameters and key code, for the requesting package. The operation system then transmits the setting to the main CPU. Upon receipt of the setting from the operation system via the LAN, the main CPU sets the requesting package appropriately.

Figure 8:
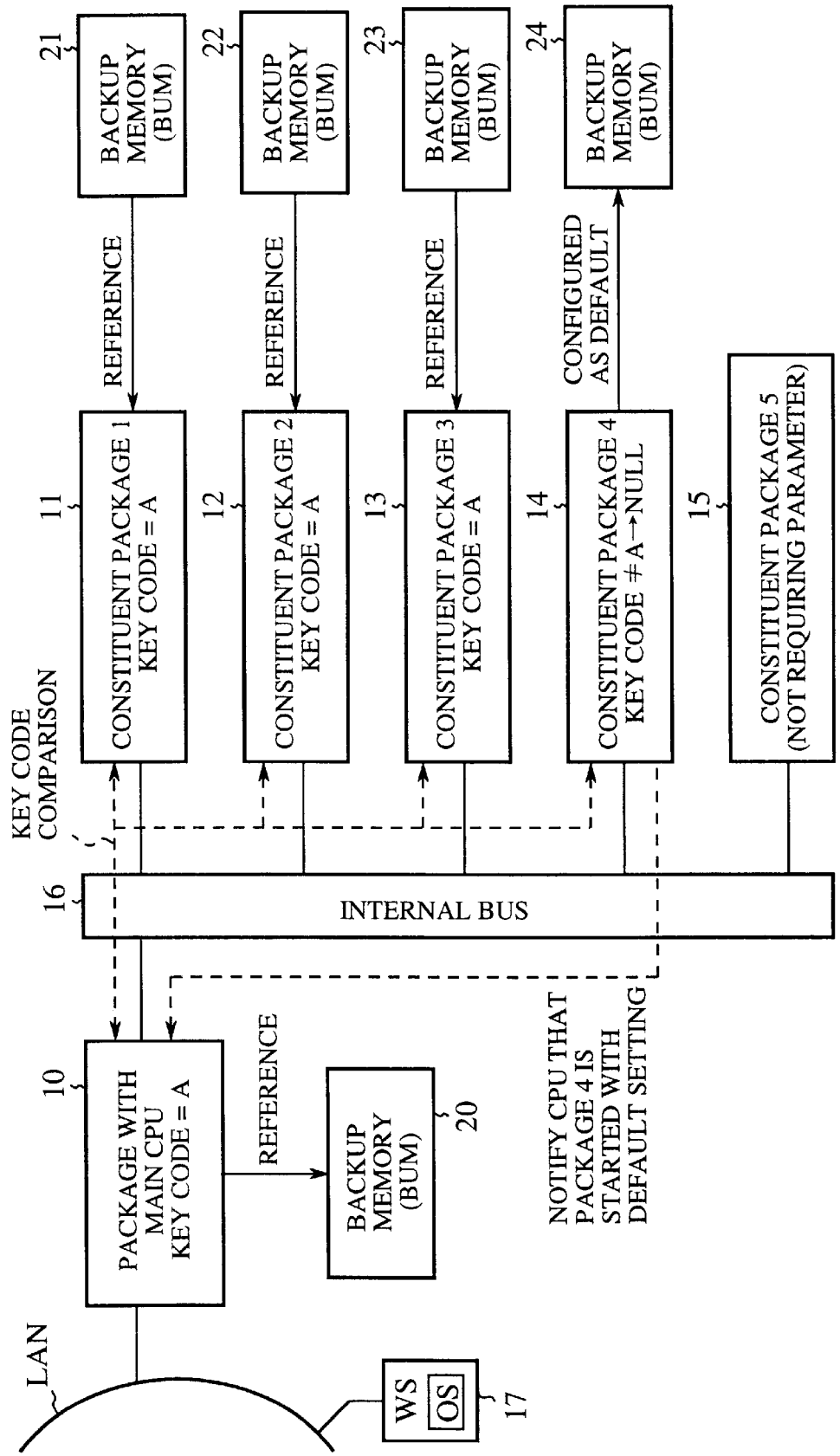
FIG. 8 is a block diagram showing the construction of the transmission system based on the backup memory configuration according to the third embodiment and showing still another operation at start-up of the transmission system.

FIG. 8 shows a start-up operation performed when the global key code A from the CPU does not match the key code maintained by the constituent package 14. A shown in FIG. 8, since the key codes do not match, the constituent package 14 start itself with the key code set to NULL and notifies the main CPU that it is started with the default setting.

Upon confirmation that the constituent package 14 is started with the default setting, the main CPU makes a determination as to whether the setting for the constituent package 14 is stored in the backup memory 20. If the setting is stored, the main CPU reads out the parameters and key code for the constituent package 14 and transmits the same to the constituent package 14. Upon receipt of the parameters and key code, the constituent package 14 sets the parameters and key code in itself. If it is determined that the setting for the constituent package 14 is not stored in the backup memory 20, the main CPU requests the operation system of the workstation 17 to deliver the necessary data. The main CPU transmits the data thus retrieved to the constituent package 14.

Figure 9:
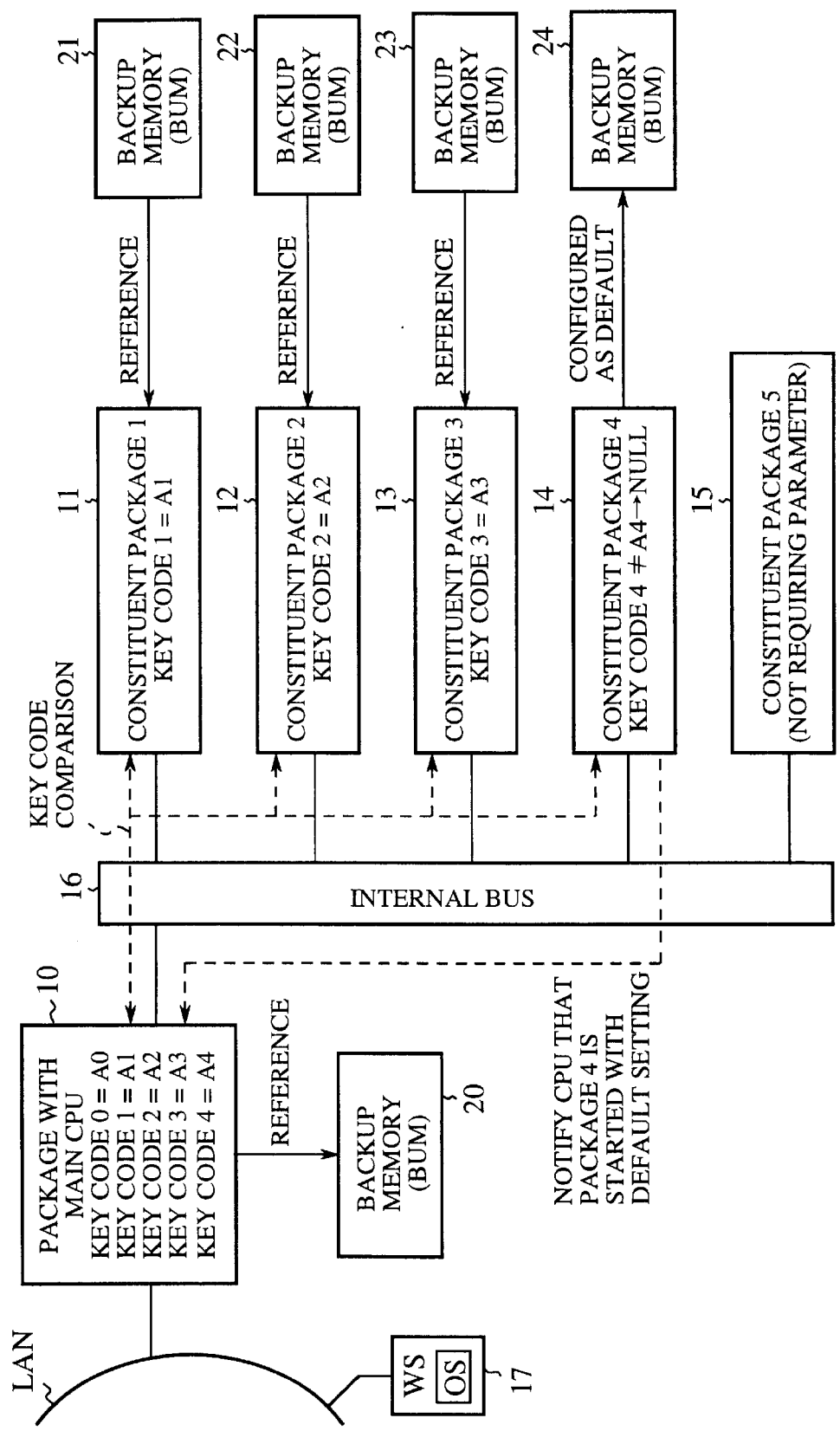
FIG. 9 is a block diagram showing the construction of the transmission system based on the backup memory configuration according to the third embodiment and showing yet another operation at start-up of the transmission system.

FIG. 9 shows a start-up operation performed when the unique key codes A1–A4 are maintained for the constituent packages 11–14, respectively, and when the key code A4 maintained by the main CPU does not match the key code maintained by the constituent package 14. As shown in FIG. 9, since the key codes do not match, the constituent package 14 starts itself with the key code set to NULL and notifies the main CPU that it is started with the default setting.

Upon confirmation that the constituent package 14 is started with the default setting, the main CPU makes a determination as to whether the setting for the constituent package 14 is stored in the backup memory 20. If the setting is stored, main CPU reads the setting, including the parameters and key code, for the constituent package 14 and transmits the parameters and key code thus read out to the constituent package 14. Upon receipt of the parameters and key code, the constituent package 14 sets the parameters and key code in itself. If the setting for the constituent package 14 is not stored in the backup memory 20 for the main CPU, the operation system is referred to for the necessary data.

Thus, according to the third embodiment, a backup memory is provided for a main CPU package and for each of the constituent packages requiring parameter setting. A key code is used to ensure consistency of data in the backup memories. When the transmission system goes through an initial start-up and is then re-started due to a power shutdown, a determination that the system is recovering from a power shutdown is readily made by referring to the key code. The constituent packages as well as the main CPU package are started automatically and in a parallel manner based on the key code maintained in the constituent packages as well as in the main CPU package. As a result, the time required for start-up is reduced.

Embodiment 4

Figure 10:
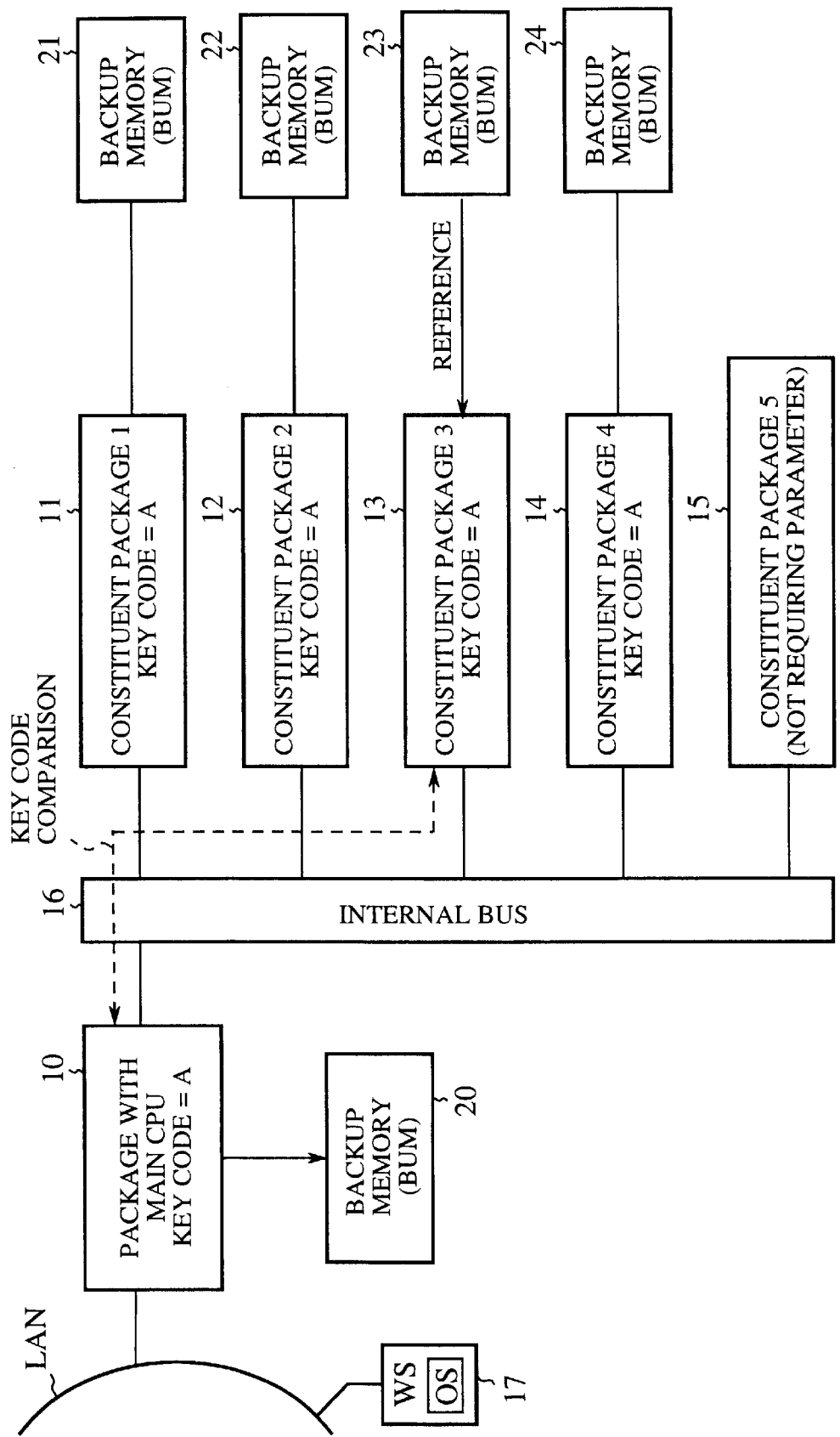
FIG. 10 is a block diagram showing the construction of a transmission system for communication based on a backup memory configuration according to a fourth embodiment and showing an operation at start-up of a constituent package.
Figure 11:
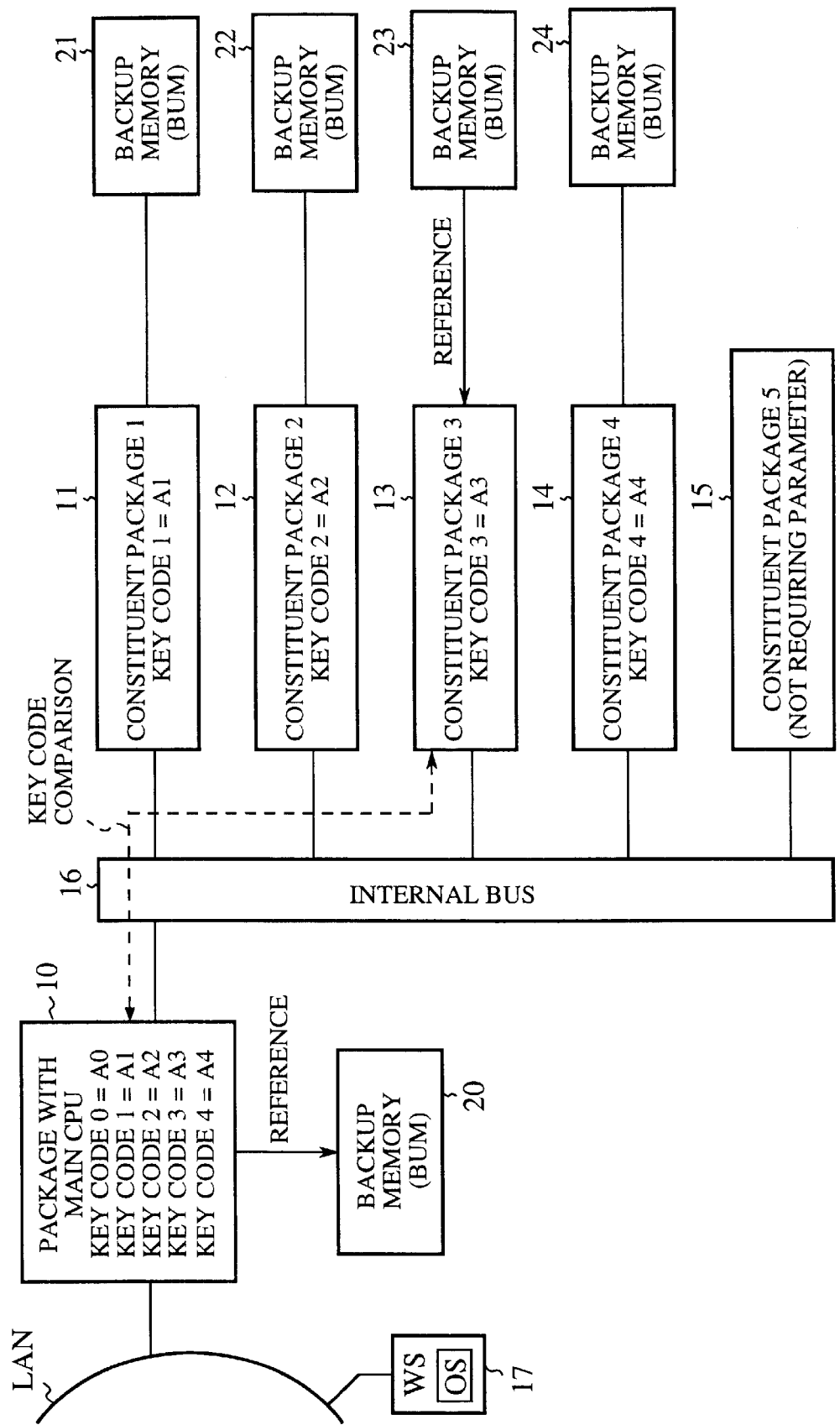
FIG. 11 is a block diagram showing the construction of the transmission system for communication based on the backup memory configuration according to the fourth embodiment and showing another operation at start-up of a constituent system.

FIGS. 10 and 11 are block diagrams showing the construction of the transmission system for communication based on the backup memory configuration according to the fourth embodiment. The construction of the transmission system is the same as that of the first embodiment. Like numerals represent like components and the description thereof is omitted.

A description will now be given of an operation at start-up of the transmission system performed after a constituent package is detached and then reattached to the system. The following description is directed to a case where one of the constituent packages 11–14 is detached from the system and then reattached thereto, and where the key codes show a match after the reattachment.

If the transmission system is operating normally, the key code maintained by the constituent package should match that of the main CPU.

When one of the constituent packages is detached from the system in this state and reattached to the system, a start-up process of the reattached constituent package is performed.

The main CPU recognizes that the constituent package 13 is reattached by finding that the packages 11, 12, 14 and 15 are accommodated and activated in the transmission system. The main CPU then prompts a start-up process of the constituent package 13. The package 13 prompted by the main CPU to start compares the key code maintained by the main CPU with the key code maintained by the package 13. If it is determined that the key codes match, the package 13 starts itself in accordance with the data stored in the backup memory 23 attached thereto.

FIG. 10 illustrates a start-up process in a set-up where the global key code A is maintained in the entirety of the transmission system. As shown in FIG. 10, when the constituent package 13 is detached and then reattached, the package 13 makes a determination as to whether the key code that it maintains match the key code A from the main CPU. Since there is a match in the example shown in FIG. 10, the constituent package 13 reads out the data stored in the backup memory 23 so as to perform a start-up process.

FIG. 11 illustrates a start-up process in a set-up where the unique codes A1–A4 are maintained for the constituent packages 11–14, respectively. As shown in FIG. 11, when the constituent package 13 is detached and then reattached, the package 13 makes a determination as to whether the key code that it maintains match the key code A3 from the main CPU. Since there is a match in the example shown in FIG. 11, the constituent package 13 reads out the data stored in the backup memory 23 so as to perform a start-up process.

Thus, according to the fourth embodiment, a backup memory is provided for a main CPU package and for each of the constituent packages requiring parameter setting. A key code is used to ensure consistency of data in the backup memories. When a constituent package is detached and then reattached to the system, the reattached package can start itself automatically based on the setting, including the key code, maintained by the reattached package itself. As a result, the time required for start-up of the constituent package is reduced.

Embodiment 5

Figure 12:
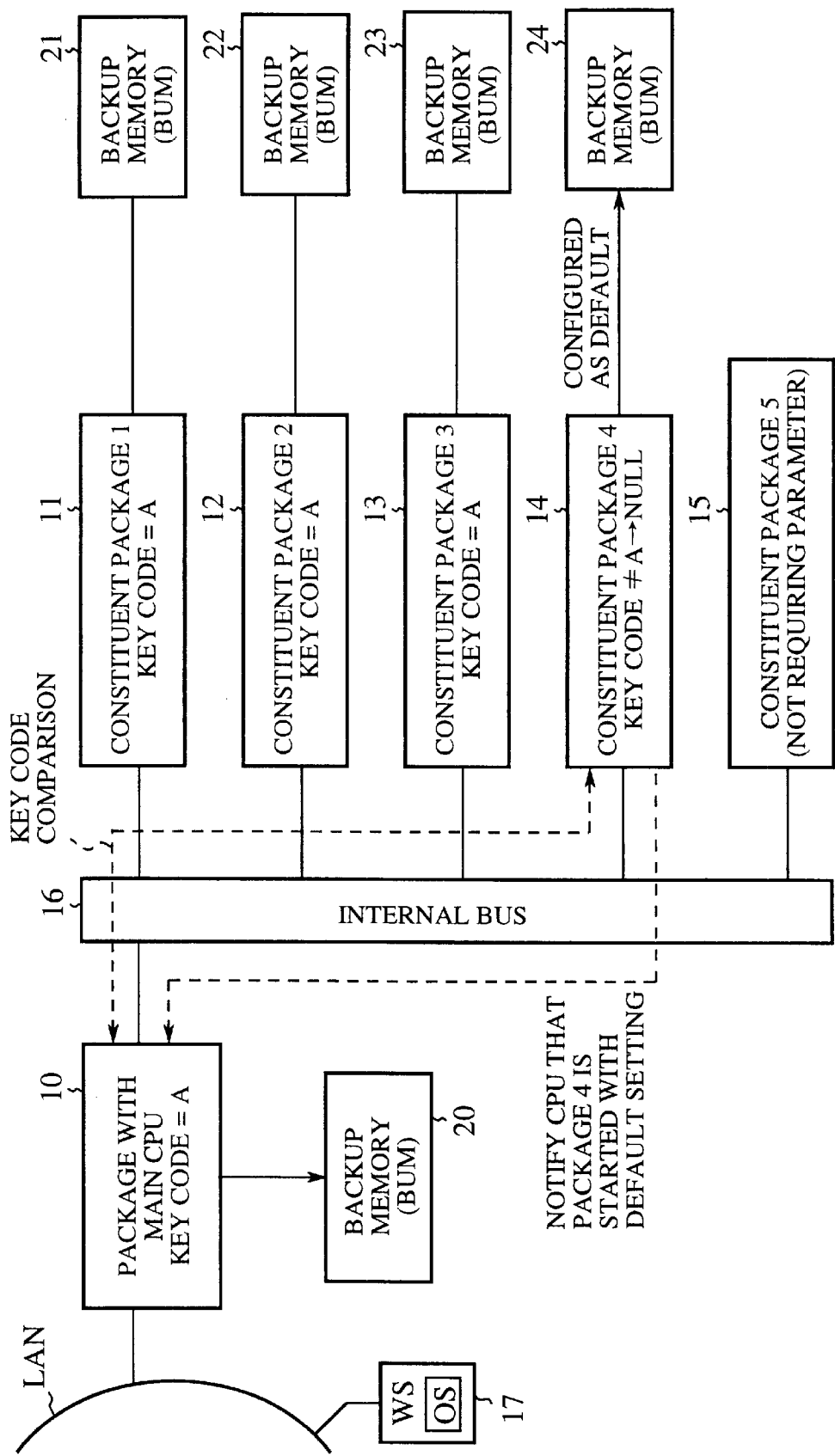
FIG. 12 is a block diagram showing the construction of a transmission system for communication based on a backup memory configuration according to a fifth embodiment and showing an operation at start-up of a constituent system after an exchange.
Figure 13:
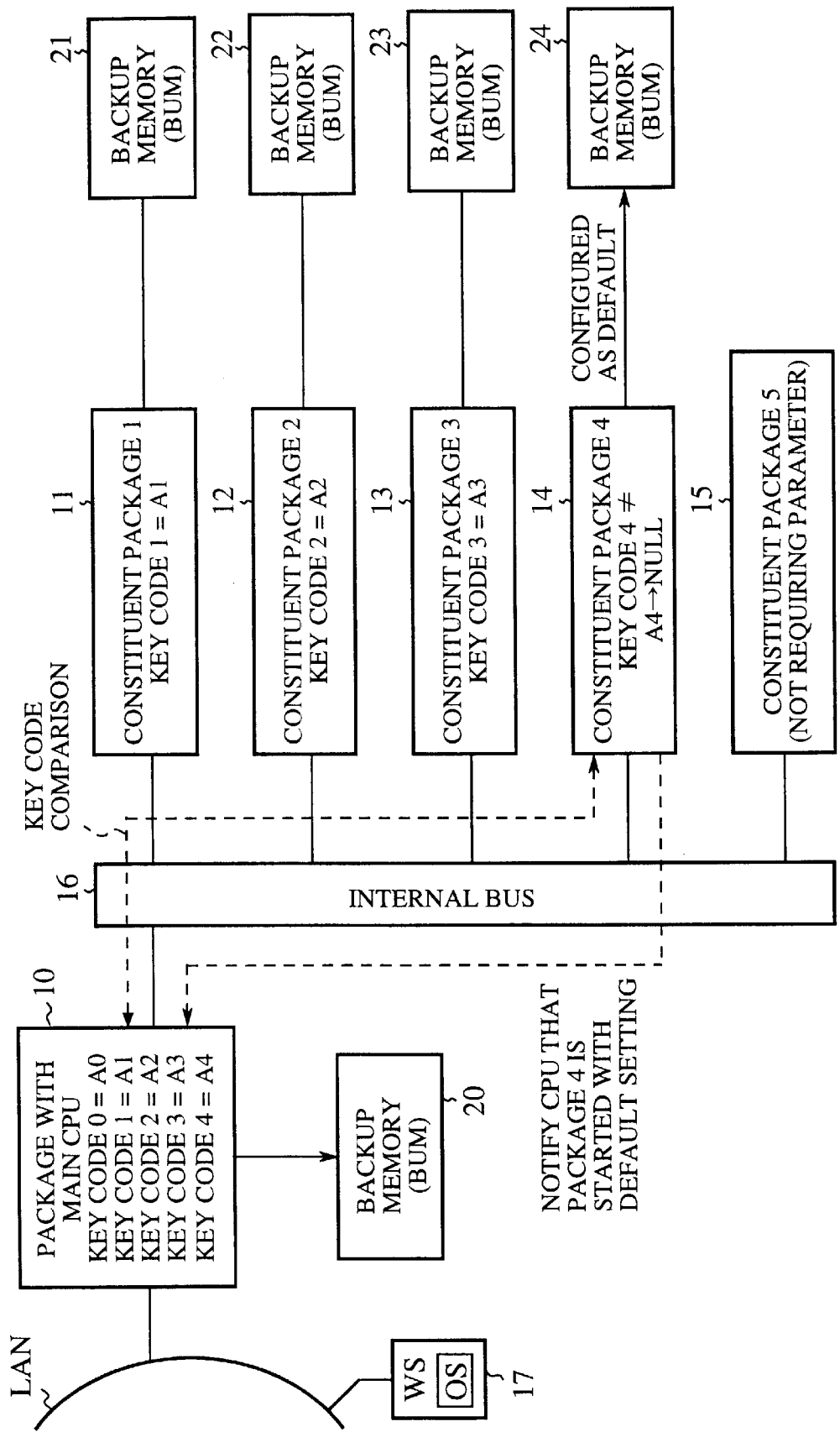
FIG. 13 is a block diagram showing the construction of the transmission system for communication based on the backup memory configuration according to the fifth embodiment and showing another operation at start-up of a constituent system after an exchange.

FIGS. 12 and 13 are block diagrams showing the construction of the transmission system for communication based on the backup memory configuration according to the fifth embodiment. The construction of the transmission system is the same as that of the first embodiment. Like numerals represent like components and the description thereof is omitted.

A description will now be given of a start-up operation performed after a constituent package is detached in exchange for another package. The following description is directed to a case where one of the constituent packages 11–14 is detached in exchange for another package, and where the key codes do not show a match after the reattachment.

If the transmission system is operating normally, the key code maintained by the constituent package should match that of the main CPU.

When one of the constituent packages is detached from the system in this state in exchange for another package, a start-up process of the attached constituent package is performed.

The main CPU recognizes that one of the constituent packages is detached in exchange for another package by finding that the other packages are accommodated and activated in the transmission system. The main CPU then prompts the attached package to start. The package prompted by the main CPU to start compares the key code maintained by the main CPU with the key code maintained by the prompted package. If it is determined that the key codes do not match, the prompted package defaults to the data stored in the backup memory attached thereto and start itself with the key code set to NULL. The package thus started notifies the main CPU that the package is started with the default setting and requests the main CPU to initiate a recovery process.

FIG. 12 illustrates a start-up operation for the constituent package 14 in a set-up where the global key code A is maintained in the entirety of the transmission system. As shown in FIG. 12, when the constituent package 14 is detached in exchange for another package, the main CPU recognizes that the constituent package 14 is detached in exchange for another package by finding that the other packages 11–13 are accommodated and activated in the transmission system. The main CPU then prompts the attached package (which will now be referred to as the replacing package 14) to start.

The replacing package 14 determines whether the key code that it maintains match the key code A from the CPU. Since the key codes do not match in the example shown in FIG. 12, the replacing package 14 reads out the data stored in the backup memory 24 as default and starts itself with the key code set to NULL. The replacing package 14 thus started notifies the main CPU that the replacing package 14 is started with the default setting and requests the main CPU to initiate a recovery process. The main CPU then performs the requested recovery process. The recovery process according to the fifth embodiment is the same as the corresponding process in the first and second embodiments.

FIG. 13 shows a start-up process for the constituent package 14 in a setup where the main CPU maintains the unique key codes A1–A4 for the constituent packages 11–14, respectively. As shown in FIG. 13, when the constituent package 14 is detached in exchange for another package, the main CPU recognizes that the constituent package 14 is detached by finding that the other packages 11–13 are accommodated and activated in the transmission system. The main CPU then prompts the attached package 14 to start.

The replacing package 14 determines whether the key code that it maintains match the key code A4 from the CPU. Since the key codes do not match in the example shown in FIG. 13, the replacing package 14 reads out the data stored in the backup memory 24 as default and starts itself with the key code set to NULL. The replacing package 14 thus started notifies the main CPU that the replacing package 14 is started with the default setting and requests the main CPU to initiate a recovery process. The main CPU then performs the requested recovery process. The recovery process according to the fifth embodiment is the same as the corresponding process in the first and second embodiments.

Thus, according to the fifth embodiment, a backup memory is provided for a main CPU package and for each of the constituent packages requiring parameter setting. A key code is used to ensure consistency of data in the backup memories. It is ensured that, when a constituent package is detached in exchange for another constituent package, the attached package notifies the main CPU that the attached package is started with the default setting and requests the main CPU to initiate a recovery process. Thus, the time required for start-up of the constituent package is reduced.

Embodiment 6

Figure 14:
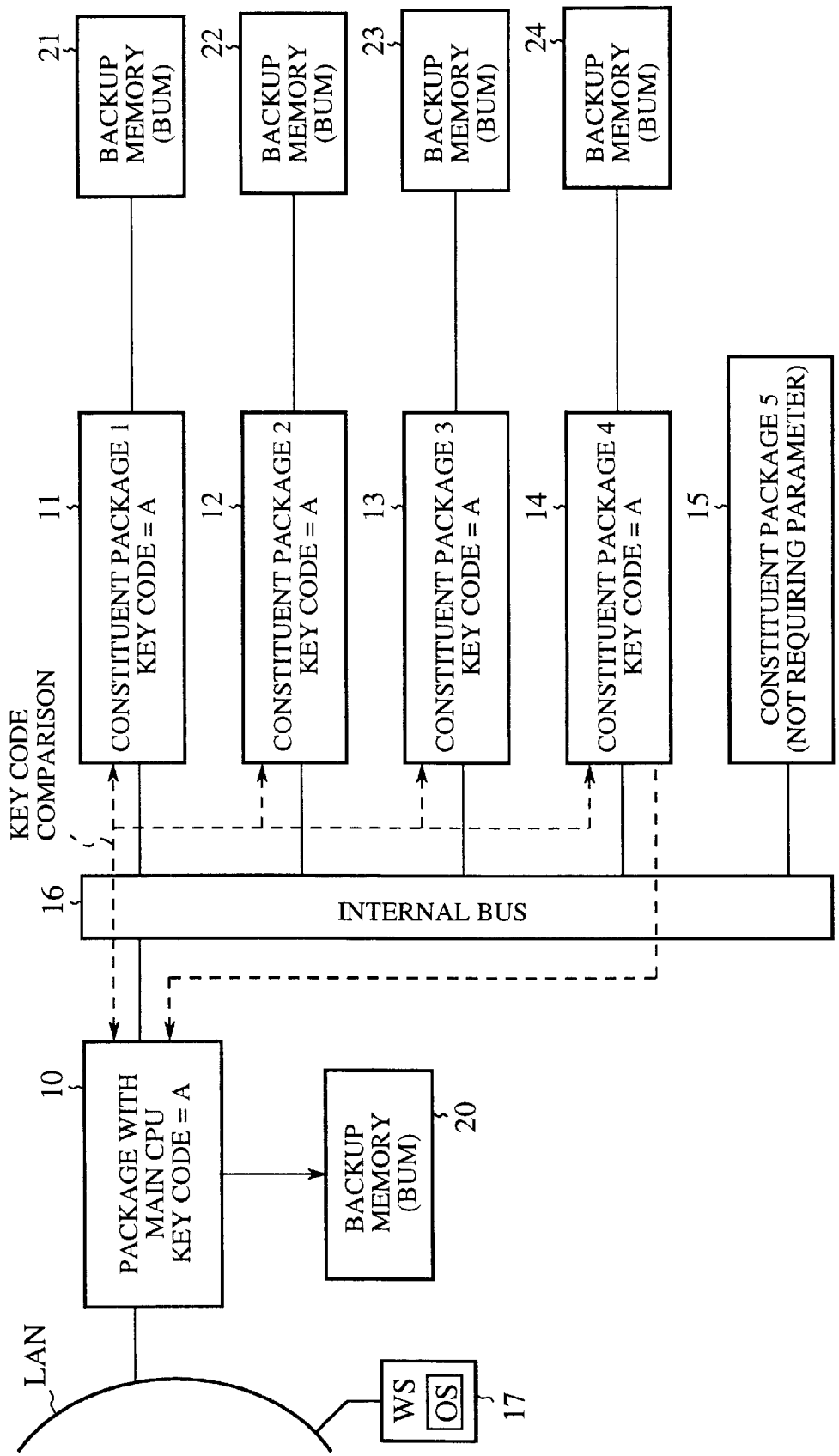
FIG. 14 is a block diagram showing the construction of a transmission system for communication based on a backup memory configuration according to a sixth embodiment and showing an operation at start-up of a package with a main CPU mounted thereon.
Figure 15:
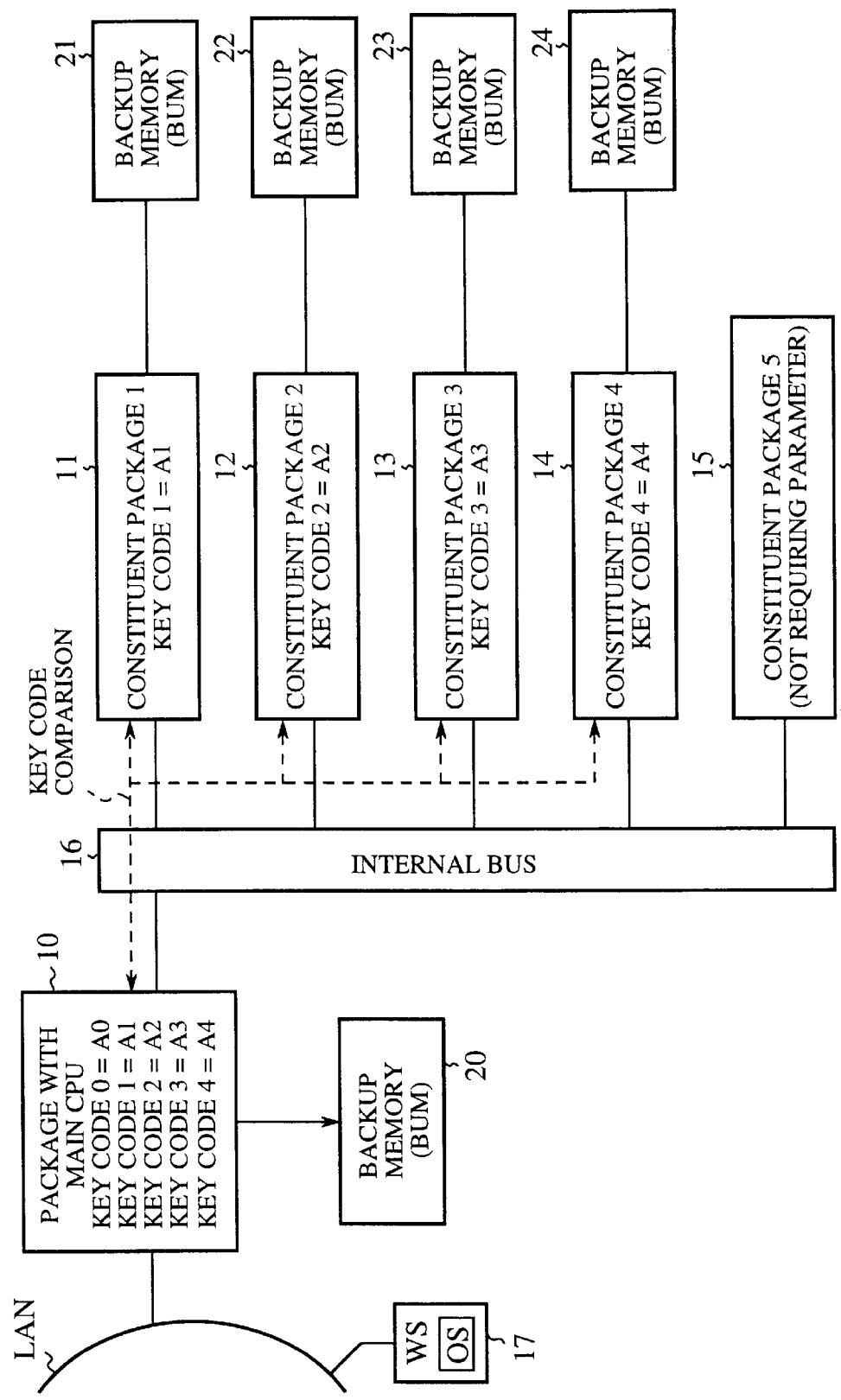
FIG. 15 is a block diagram showing the construction of the transmission system for communication based on the backup memory configuration according to the sixth embodiment and showing an operation at start-up of the package with a main CPU mounted thereon.

FIGS. 14 and 15 are block diagrams showing the construction of the transmission system for communication based on the backup memory configuration according to the sixth embodiment. The construction of the transmission system is the same as that of the first embodiment. Like numerals represent like components and the description thereof is omitted.

The following description is directed to a start-up operation according to the sixth embodiment performed when the main CPU package is detached from the system and then reattached thereto.

When the transmission system is operated normally, the key code maintained by each of the constituent packages 11–14 should match the corresponding key code maintained by the main CPU.

When the main CPU package 10 is detached from the system in this state and then reattached thereto, a start-up process of the main CPU 10 is performed.

The main CPU in the main CPU package 10 recognizes that it is going through a start-up process, by finding that the constituent packages 11–15 remain accommodated and activated in the transmission system.

The main CPU compares the key codes that it maintains with the key code maintained by the corresponding one of the constituent packages 11–14. If it is determined that the key codes match, the main CPU reads out the data stored in the backup memory 20 attached to the main CPU package 10 so as to start the main CPU package 10.

FIG. 14 illustrates a start-up process for the main CPU package 10 performed in a set-up where the global key code A is maintained in the entirety of the transmission system.

As shown in FIG. 14, the main CPU package 10 is detached and then reattached to the system. The main CPU recognizes that it is detached and then reattached, by finding that the key code maintained thereby matches the key code maintained by the constituent packages 11–14, that the key code maintained by the main CPU is not set to NULL, and that the constituent packages 11–15 are accommodated and activated in the transmission system. Thereupon, the main CPU reads out the data stored in the backup memory 20 so as to perform a start-up process for the main CPU package 10.

FIG. 15 illustrates a start-up operation performed in a set-up where the main CPU maintains the unique key codes K1–K4 for the constituent packages 11–14, respectively. As shown in FIG. 15, when the main CPU package 10 is detached and then reattached, the main CPU recognizes that it is detached and then reattached, by finding that the key codes maintained thereby matches the key codes maintained by the constituent packages 11–14, that the key code maintained by the main CPU is not set to NULL, and that the constituent packages 11–15 are accommodated and activated in the transmission system. Thereupon, the main CPU reads out the data stored in the backup memory 20 so as to perform a start-up process for the main CPU package 10.

Thus, according to the sixth embodiment, a backup memory is provided for a main CPU package and for each of the constituent packages requiring parameter setting. A key code is used to ensure consistency of data in the backup memories. It is ensured that, when the main CPU package is detached and then reattached, the main CPU package can automatically perform a start-up process based on the setting and key code maintained by the main CPU package. Thus, the time required for start-up of the main CPU package is reduced.

Embodiment 7

Figure 16:
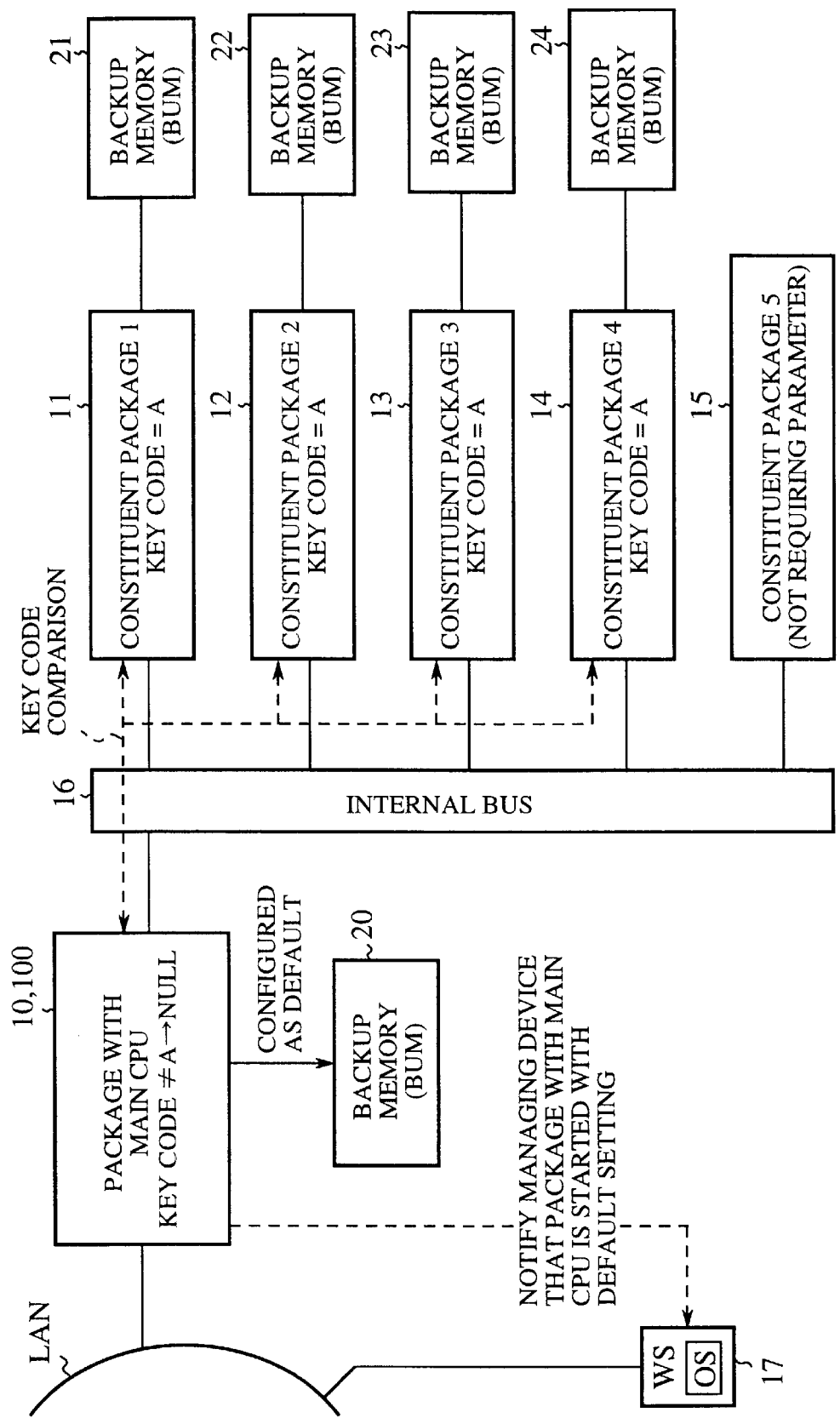
FIG. 16 is a block diagram showing the construction of a transmission system for communication based on a backup memory configuration according to a seventh embodiment and showing an operation at start-up of a package with a main CPU mounted thereon when the package is exchanged.
Figure 17:
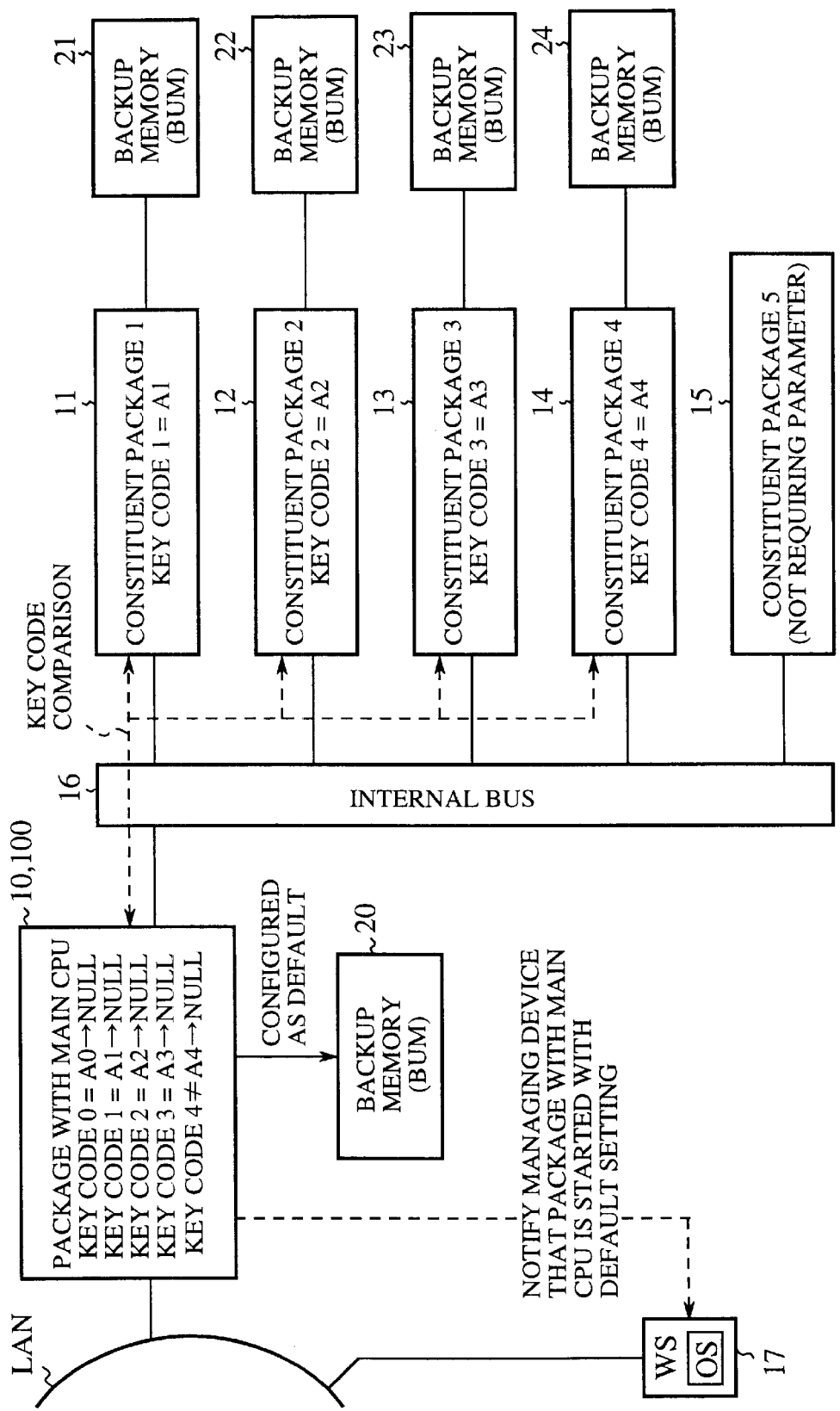
FIG. 17 is a block diagram showing the construction of the transmission system for communication based on the backup memory configuration according to the seventh embodiment and showing another operation at start-up of the main CPU package when the package is exchanged.

FIGS. 16 and 17 are block diagrams showing the construction of the transmission system for communication based on the backup memory configuration according to the seventh embodiment. Numerals 10, 100 indicate that the main CPU package 10 is detached in exchange for a new main CPU package 100. The construction of the transmission system is the same as that of the first embodiment. Like numerals represent like components and the description thereof is omitted.

The following description is directed to a start-up operation of the main CPU package 100 according to the seventh embodiment performed when the main CPU package 10 is detached from the system due to a failure or the like in exchange for the new main CPU package 100.

When the transmission system is operated normally, the key code maintained by each of the constituent packages 11–14 should match the corresponding key code maintained by the main CPU 10.

When a failure of the main CPU package 10 occurs in this state and the main CPU package 10 is detached from the system in exchange for the main CPU package 100, the start-up process of the main CPU package 100 is performed.

The main CPU in the main CPU package 100 recognizes that it is attached to the system, by finding that the constituent packages 11–15 are accommodated and activated in the transmission system. The main CPU package 100 then initiates the start-up operation of itself. The main CPU in the main CPU package 100 compares the key codes maintained thereby with the key codes maintained by the constituent packages 11–14 and arrives at a determination that the key codes do not match. The main CPU then defaults to the configuration data stored in the backup memory 20 attached to the main CPU package 100. The main CPU then start the main CPU package 100 with the key code set to NULL. The main CPU then notifies the operation system of the workstation 17 attached to the LAN that the main CPU package 100 is started with the default setting and requests the operation system to initiate a recovery process.

Upon a request for the recovery process from the main CPU package 100, the operation system of the workstation 17 makes a determination as to whether the setting for the main CPU package 100 is stored in any of the constituent packages in the transmission system. If the answer is affirmative, the operation system causes the main CPU package 100 to retrieve the parameters and key code from the package and to set the parameters and key code thus retrieved in the main CPU package 100.

If it is determined that none of the constituent packages 11–14 maintains a backup of the setting for the main CPU package 100, the main CPU package starts a resetting operation for retrieving the configuration data, including parameters, from a database connected to the operation system of the workstation 17. The main CPU package 100 may also request the constituent packages 11–14 to revert to the default setting in order to match the setting for the main CPU package with that of the constituent packages 11–14.

FIG. 16 illustrates a start-up operation of the main CPU package 100 performed in a set-up where the global key code A is maintained in the entirety of the transmission system. As shown in FIG. 16, when the main CPU package 10 is detached in exchange for the main CPU package 100, the main CPU of the package 100 recognizes that the main CPU package 100 is attached to the system by finding that the constituent packages 11–15 are accommodated and activated in the transmission system. The main CPU then requests the operation system of the workstation 17 to initiate a startup process.

The main CPU package 100 compares the key code NULL that it maintains with the key code A retrieved from the constituent packages 11–14. In the example of FIG. 16, the key codes do not match so that the main CPU package 100 reads the data stored in the backup memory 20 and starts itself with the key code set to NULL. The main CPU then notifies the operation system of the workstation 17 that the main CPU package 100 is started with the default setting and requests the operation system to initiate a recovery process.

FIG. 17 illustrates a start-up operation of the main CPU package 100 in a set-up where the main CPU maintains the unique key codes K1–K4 for the constituent packages 11–14, respectively. As shown in FIG. 17, when the main CPU package 10 is detached in exchange for the main CPU package 100, the main CPU of the package 100 recognizes that the main CPU package 100 is attached to the system by finding that the constituent packages 11–15 are accommodated and activated in the transmission system. The main CPU then requests the operation system of the workstation 17 to initiate the start-up process.

The main CPU of the package 100 compares the key code NULL that it maintains with the key codes A1–A4 retrieved from the constituent packages 11–14, respectively. In the example of FIG. 17, the key codes do not match so that the main CPU package 100 reads out the data stored in the backup memory 20 as default setting and then starts itself with the key code set to NULL. The main CPU then notifies the operation system of the workstation 17 that the main CPU package 100 is started with the default setting and requests the operation system to initiate a recovery process.

Thus, according to the seventh embodiment, a backup memory is provided for a main CPU package and for each of the constituent packages requiring parameter setting. A key code is used to ensure consistency of data in the backup memories. It is ensured that, when the main CPU package is detached in exchange for a new main CPU package, the replacing main CPU package, when started, notifies the operation system or the like that the replacing main CPU package is started with the default setting and requests the operation system to initiate a recovery process. Thus, the time required for start-up of the main CPU package is reduced.

Embodiment 8

Figure 18:
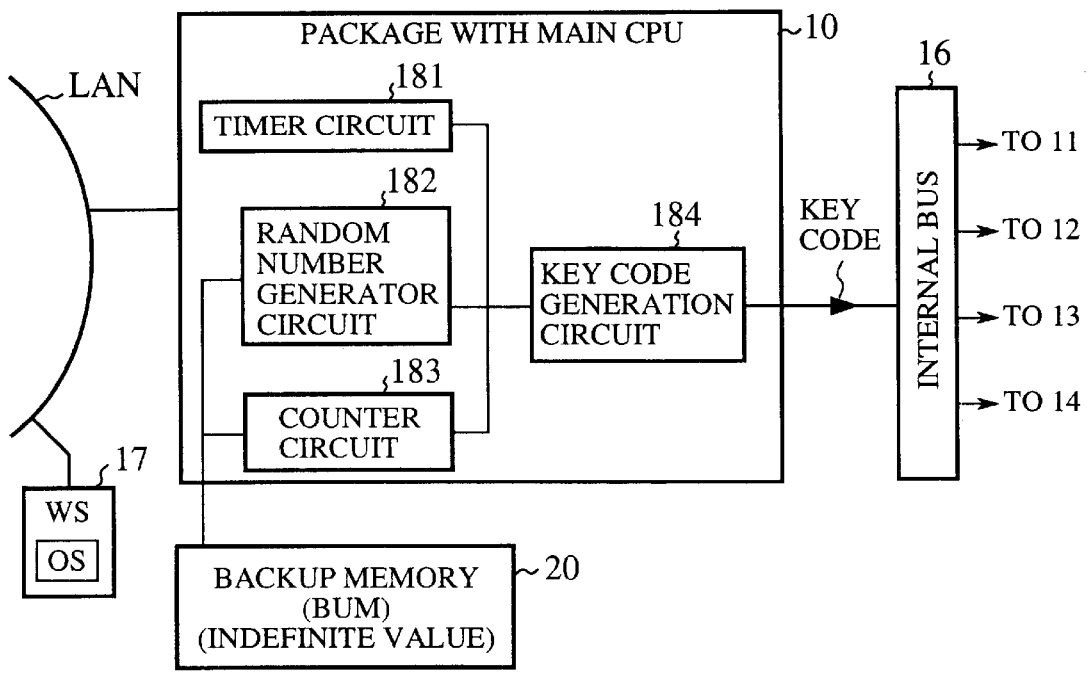
FIG. 18 is a block diagram showing the construction of a transmission system for communication based on a backup memory configuration according to an eighth embodiment and showing a key code generation circuit in the main CPU package.
Figure 19:
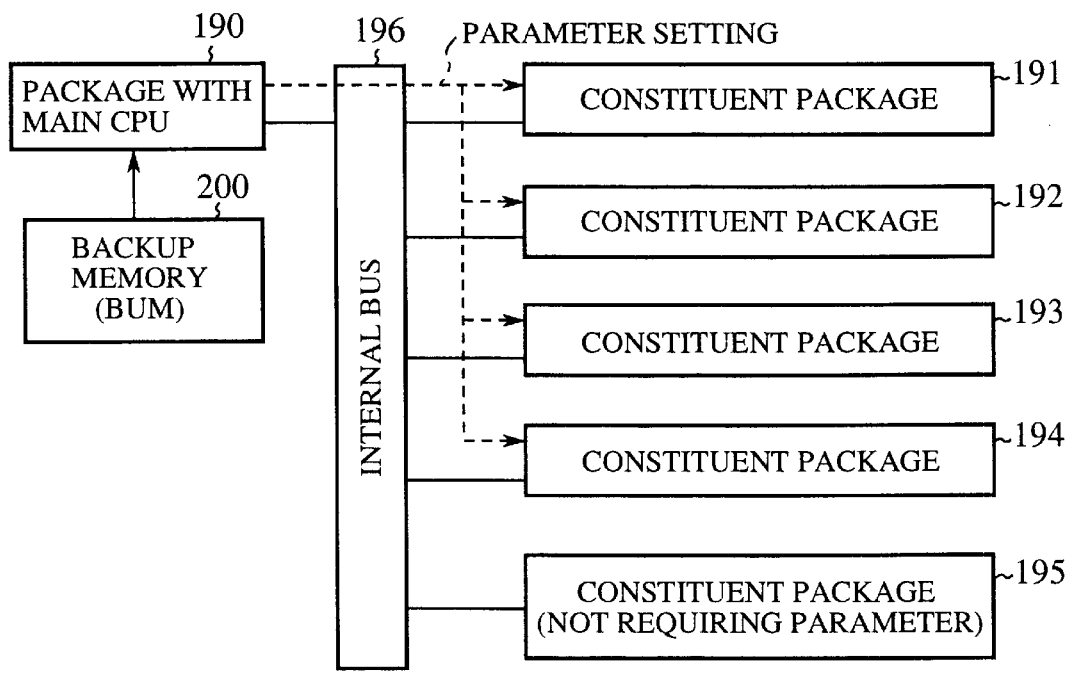
FIG. 19 is a block diagram showing a transmission system for communication according to the related art.

FIG. 18 is a block diagram showing the construction of the transmission system for communication based on the backup memory configuration according to the eighth embodiment. More specifically, FIG. 18 is a block diagram showing a key code generation circuit provided in the main CPU package 10. Referring to FIG. 18, numeral 181 indicates a time circuit for generating and outputting a time signal, 182 indicates a random number generator circuit for generating a random number, 183 indicates a counter circuit for generating and outputting a count, 184 indicates a key code generation circuit for receiving signals from the time circuit 181, the random number generator circuit 182 and the counter circuit 183 and for generating and outputting key codes identifying the constituent packages 11–14 as well as a key code for the main CPU. The remaining aspects of the construction of the transmission system are the same as the corresponding aspects of the first embodiment. Like numerals represent like components and the description thereof is omitted.

A description will now be given of the operation according to the eighth embodiment.

The key code generation circuit 184 generates key codes identifying the main CPU package 10 and the constituent packages 11–14 and outputs the key codes thus generated to the main CPU package 10 and the corresponding one of constituent packages 11–14.

The key code may be generated using the time information output by the time circuit 181 when the key code assignment step is being executed. In this case, by using the time information in increments of $\mu$ seconds, the key code generation circuit 184 can generate the key code identifying the main CPU package 10 or the constituent packages 11–14.

The key code may also be generated by using pseudo random number generated by the random number generator circuit 182. More specifically, the key code generation circuit 184 may generate the key code determined by the pseudo random number generated by the random number generator 182. In this case, by ensuring that the seed value of the pseudo random number is not a fixed value, and by using a probabilistic value such as an indefinite value occurring at power-on of a DRAM, as a seed value for the random number generator circuit, the key code generation circuit 184 can generate the key code identifying the main CPU package 10 or the constituent packages 11–14.

Alternatively, the key code generation circuit 184 may generate a key code using a count generated by the counter circuit 183. By using a probabilistic value such as an indefinite value occurring at power-on of a DRAM as an initial value for the counter circuit 183, the key code generation circuit 184 can generate the key code identifying the main CPU package 10 or the constituent packages 11–14.

Alternatively, values generated from the time information provided by the time circuit, the pseudo random number generated by the random number generator circuit 182 and the count provided by the counter circuit 183 may be used in combination for the key code generation circuit 184 to generate the key code identifying the main CPU package 10 or the constituent packages 11–14.

Thus, according to the eighth embodiment, key codes maintained by the main CPU package and the constituent packages are efficiently generated by the key code generation circuit so that the key codes are used for the main CPU package and the constituent packages to maintain the setting for respective packages. Accordingly, the constituent packages can be started automatically and in a parallel manner so that the time required to start the entirety of the transmission system is reduced.

The present invention is not limited to the above-described embodiments, and variations and modifications may be made without departing from the scope of the present invention.

What is claimed is:

1. A backup memory configuration system for use in a communication transmission system having a control package provided with a main CPU for performing control functions of said transmission system, and a plurality of constituent packages provided with respective devices for performing communication functions of said transmission system, and an operation system for supplying configuration data required for operation of the plurality of constituent packages, comprising:

a plurality of backup memories, each attached to a respective one of the control package and the plurality of constituent packages;

wherein each of the control package and the plurality of constituent packages stores, in the backup memory attached to the package, a key code identifying the package and the configuration data for the package; and the control package allocates and distributes the key codes to the plurality of constituent packages when the transmission system is started, and allocates and distributes the key code to an individual constituent package when the configuration data is required to be set in the individual constituent package after the transmission system already has been started.

2. The backup memory configuration system according to claim 1, wherein, when a power of any of the plurality of constituent packages is turned on so that the package is started, the key code maintained by the main CPU provided in the control package is compared with the key code stored in the backup memory for the started package so as to determine whether the package was used in the same transmission system before the power is turned on;

when it is determined that the started package was used in the same transmission system before the power is turned on, the key code and the configuration data stored in the backup memory for the started package are read out so that a start operation is performed using the key code and the configuration data thus read out; and when it is determined that the started package was not used in the same transmission system before the power is turned on, the key code stored in the backup memory for the started package is discarded so that a start operation is performed using a predetermined default setting.

3. The backup memory configuration system according to claim 2, wherein when it is determined that any of the control package and the plurality of constituent packages is being used in a transmission system different from the transmission system in which the started package was used, the started package notifies one of the control package and the operation system that the package is started with the default setting, and sets the configuration data retrieved from one of the control package and the operation system in the started package.

4. The backup memory configuration system according to claim 1; wherein when it is determined, upon a start-up of the transmission system, that the transmission system is going through an initial start-up process as a result of key code comparison by the main CPU, the main CPU generates new key codes and transmits the generated key codes to each of the plurality of constituent packages that refer to the key code, whereupon each of the plurality of constituent packages receiving the key code initiates a start-up operation based on the received key code; and wherein when it is determined that the packages are being started in the same transmission system as a previous transmission system, the key code and the configuration data stored in the backup memories for the packages are read out so that each of the packages is started based on the key code and the configuration data thus read out.

5. The backup memory configuration system according to claim 1, wherein the key code is generated using time value output by the time circuit when the system is started.

6. The backup memory configuration system according to claim 1, wherein an indefinite value occurring in a memory area when the transmission system is started is used as a seed for a random number generator circuit so that the key code is generated based on a value generated by the random number generator circuit.

7. The backup memory configuration system according to claim 1, wherein an indefinite value occurring in a memory area when the transmission system is started is used as a seed for a counter circuit so that the key code is generated based on a value generated by the counter circuit.

8. A communication transmission system comprising:

a control package provided with a main CPU for performing control functions of the transmission system;

a plurality of constituent packages provided with respective devices for performing communication functions of the transmission system; and a plurality of backup memories, each attached to a respective one of the control package and the plurality of constituent packages; wherein each of the control package and the plurality of constituent packages stores, in the backup memory for the package, a key code identifying the package and configuration data required for operation of the package; and the control package allocates and distributes the key codes to the plurality of constituent packages when the transmission system is started, and allocates and distributes the key code to an individual constituent package when the configuration data is required to be set in the individual constituent package after the transmission system already has been started.

9. The transmission system according to claim 8, further comprising:

a time circuit for outputting a time value;

a random number generator circuit for generating a random number using an indefinite value in a memory area as a seed;

a counter circuit for generating a value using an indefinite value in the memory area as a seed;

a key code generation circuit for generating the key code based on one or a combination of values generated by said time circuit, random number generator circuit and counter circuit.

* * * * *